United States Patent [19]
Lee

[11] Patent Number: 5,282,187
[45] Date of Patent: Jan. 25, 1994

[54] PICTURE ORIENTATION MARKABLE PHOTO COMPACT DISK AND METHOD AND APPARATUS FOR USING SAME

[75] Inventor: Y. Ellen Lee, Rochester, N.Y.

[73] Assignee: Eastman Kodak Company, Rochester, N.Y.

[21] Appl. No.: 60,476

[22] Filed: May 11, 1993

Related U.S. Application Data

[63] Continuation of Ser. No. 760,650, Sep. 16, 1991, abandoned.

[51] Int. Cl.$^5$ ............................................. G11B 7/00
[52] U.S. Cl. ........................................ 369/52; 369/14; 369/58
[58] Field of Search ................... 369/30, 32, 275.3, 14, 369/15, 273, 24, 52, 58; 360/35.1, 69

[56] References Cited

U.S. PATENT DOCUMENTS

| | | | |
|---|---|---|---|
| 4,108,365 | 8/1978 | Hughes . | |
| 4,290,122 | 9/1981 | Bates et al. | 369/59 |
| 4,329,575 | 5/1982 | Roach | 369/273 |
| 4,481,412 | 11/1984 | Fields | 369/32 |
| 4,672,600 | 6/1987 | Balston et al. | 369/14 |
| 4,677,604 | 6/1987 | Selby, III et al. | 369/32 |
| 4,807,208 | 2/1989 | Geiger | 369/36 |
| 4,816,929 | 3/1989 | Bradley et al. | 360/35.1 |
| 4,841,386 | 6/1989 | Schiering | 360/69 |
| 4,872,151 | 10/1989 | Smith | 369/14 |
| 4,873,679 | 10/1989 | Murai et al. | 369/32 |
| 5,113,061 | 5/1992 | Tanaka | 369/275.3 |
| 5,119,363 | 6/1992 | Satoh et al. | 369/275.3 |

FOREIGN PATENT DOCUMENTS

59-215076 12/1984 Japan .
60-253059 12/1985 Japan .
WO86/04720 8/1986 World Int. Prop. O. .

*Primary Examiner*—Aristotelis Psitos
*Assistant Examiner*—P. W. Huber
*Attorney, Agent, or Firm*—Raymond L. Owens

[57] ABSTRACT

The present invention is a photo compact disk (CD) 10 combined with a disk reading system or player 62 in which the disk 10 has a user markable surface on the opposite side of the disk 10 from the picture information storage surface or layer. The user markable side includes a first space 12 for indicating the contents of the photo CD. A second area 14 is provided for indicating how the photos stored on the CD should be displayed. The second area 14 is divided into tracks 18-24 and each track is divided into photograph frame regions 21. Each picture stored on the compact disk has one four quadrant user markable region 21 where the quadrants indicate whether the picture should be skipped, turned clockwise or counterclockwise 90 degrees or turned 180 degrees before display. The printing which outlines the areas and provides photograph numbers is LED light transparent. The photo CD player 62 includes an LED scanner 64 for scanning the second area as the CD rotates. A timing index track 16 with timing marks thereon aids in the sampling of the user markable areas.

16 Claims, 6 Drawing Sheets

PICTURE ORIENTATION MARKABLE PHOTO COMPACT DISK AND METHOD AND APPARATUS FOR USING SAME

This a continuation of application Ser. No. 07/760,650 filed Sep. 16, 1991, now abandoned.

BACKGROUND OF THE INVENTION

1. Field of the Invention

The present invention is directed to an optically readable data storage media, such as a photo compact disk (CD), which can be annotated by the user to indicate orientation and blanking of the photographs stored on the compact disk by marking the surface of the disk opposite the data storage surface and, more particularly, to a compact disk and scanning system which automatically indicates the orientation of the picture frames as the pictures are read out for display on a television type monitor.

2. Description of the Related Art

Compact disks and compact disk systems which store and display photographs on a conventional television using a compact disk player are available from a number of manufacturers among those being NV Philips and Eastman Kodak Company. The photo compact disk, as presently configured, is a non-erasable compact disk which can be written on with a high power laser by a film processing laboratory. The images stored on the compact disk are encoded in a surface or layer of the disk, coated with a transparent material, and read from the transparent side. The back side of the disk is conventionally printed with the logo of the processing laboratory, such as Kodak, which converted the film images into digital images and stored the images on the compact disk. All the disks appear to be alike. The user must insert the disk in the player and display at least some of the pictures stored on the disk to determine the contents of the disk. If the user wants to skip or blank certain picture frames, the compact disk player must be programmed by the user to eliminate these frames during the scanning process. When the disk is removed or the compact disk player is turned off, the information concerning which frames to eliminate is destroyed; that is, the frame elimination information is volatile and not carried on the disk. In addition, if the user wishes to rotate an image, he must first display the photograph and use either a remote control or controls on the disk player itself to manually rotate the image. This orientation information is also lost when the disk is removed, or the player is turned off.

SUMMARY OF THE INVENTION

It is one object of the present invention to provide a data recording media with an external user markable area where information concerning the data is visually displayed and can be optically read.

It is an object of the present invention to provide a compact disk with a surface which can be marked by the user where the marks indicate whether a picture should be skipped during playback.

It is another object of the present invention to provide a photo compact disk which can be marked to indicate the orientation of the photographs stored thereon.

It is also an object of the present invention to provide a sensor and scanning system for reading blanking and orientation marks on a photo compact disk.

It is an additional object of the present invention to provide a photo compact disk with a surface for handwriting information concerning the contents of the compact disk.

It is a further object of the present invention to provide a photo compact disk player that automatically orients or deletes designated pictures stored on the compact disk marked by the user.

It is still another object of the present invention to provide a system for sensing hand written marks on a compact disk.

The above objects can be accomplished by a photo compact disk and disk reading system in which the disk has first and second sides. The first side includes a surface or embedded layer that stores the pictures as laser readable data. The second side is a side that can be marked with a writing instrument by the user. The user markable surface of the second side includes a first writable area for indicating the contents of the photo compact disk. A second writable area is provided on the second side for the user to indicate how the photographs stored on the compact disk should be displayed. Each picture stored on the compact disk has a four quadrant-user markable region outlined in the second area where the quadrants indicate whether the picture should be skipped, turned plus or minus 90 degrees or turned 180 degrees before display. The photo compact disk player includes a scanner for scanning the second side as the compact disk rotates. The system determines which of the quadrants has been marked based on the sensor outputs and supplies a control code to the orientation and skipping software that causes the picture to be skipped; or, if it is to be displayed, to be oriented before playing. The four quadrant regions are circumferentially arranged in rings, allowing a single line sensor to scan plural regions as the disk rotates. A clocking or timing index track aids in the sampling of the user markable areas.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
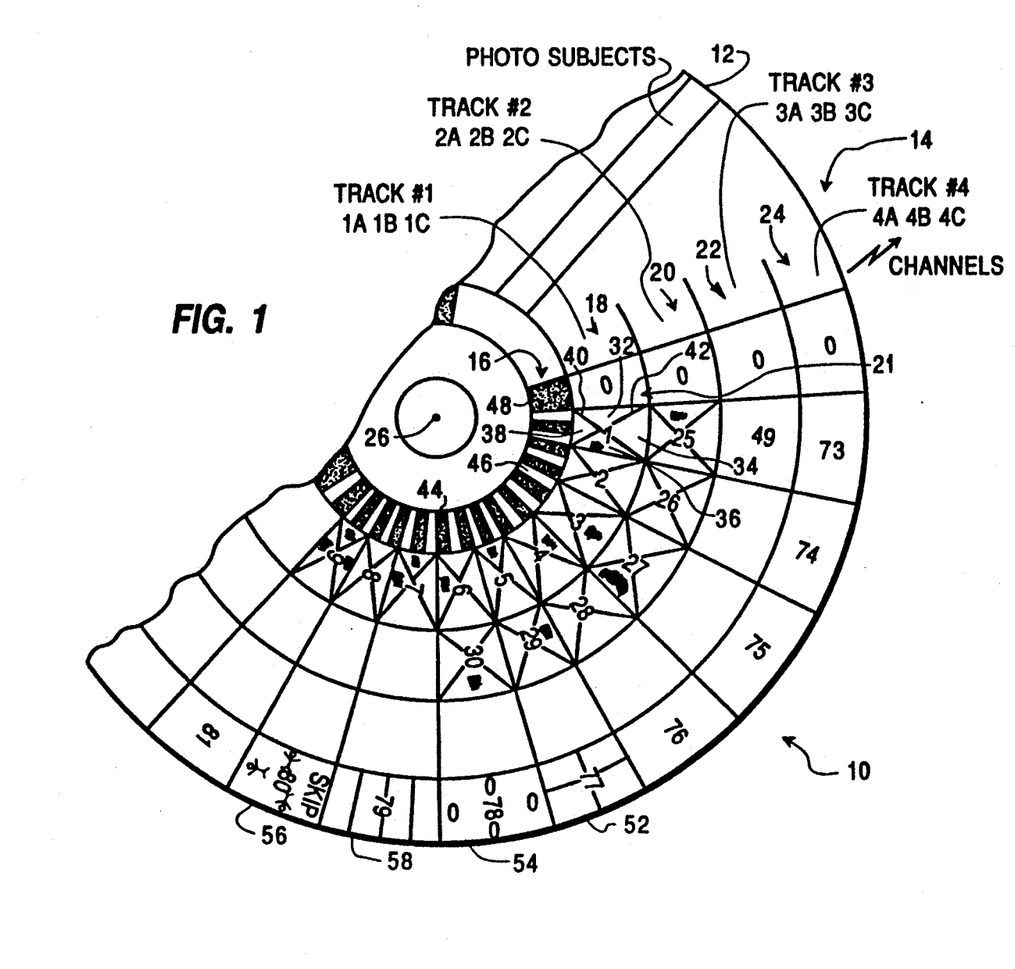
FIG. 1 illustrates the backside of a photo compact disk according to the present invention.

FIG. 1 illustrates the back side (the side opposite the data storage side) of a photo compact disk (CD) 10 and shows a first area 12 printed with an outline setting off an area in which the user can hand write notes about what is on the disk such as "Vacation In The Rockies 1991". The printed outline can be the typical printing material that is used to print conventional audio CDs with song titles, etc. It is preferable, however, that the material used for the printing be transparent to the light used to read a second area 14 of the compact disk 10. The plastic surface on both sides of a conventional photo CD will accept and retain ink from a conventional magic marker or felt tip pen and it is preferred that such an instrument be used for marking the disk 10. The ink on the CD from a felt tip pen can be removed with alcohol allowing the user to change the orientation/blanking marks. However, underneath the printing material, that is, between the printed material and the plastic of the disk, a light color paint can be applied to the markable side to allow the writing by the user to better adhere. The paint can include a roughening agent, such as sand, to make it easier to write on the disk 10. The paint will protect the disk 10 from scratching. A second area 14 includes 5 tracks 16-24 arranged circumferentially around the axis 26 of the compact disk 10 and which are used to indicate which pictures should be skipped or reoriented during display. Track 16 is a clocking track which is used to indicate when the tracks 18-24 should be sampled. Each of the tracks 18-24 includes sub-tracks, for example, track 18 includes sub-tracks 1A, 1B and 1C. Each of the tracks 18-24 is also divided into frame regions 21 and each frame region, for example, frame region 1 is divided into four quadrants 32-38. Each of the frame regions 21 also includes a printed frame number such as "5", which corresponds to the fifth photograph stored on the disk, and quadrant markers 40 and 42 which divide the frame region 1 into four quadrants. The user can use the felt tip pen or the magic marker to mark the quadrants; where a mark in quadrant 32 indicates the picture corresponding to the frame should be skipped or blanked when the picture stored on the photo CD is accessed for display, quadrant 34 indicates that the picture corresponding to the frame should be rotated counterclockwise 90 degrees, while a mark in quadrant 38 indicates the picture should be rotated clockwise 90 degrees, and a mark in quadrant 36 indicates the picture should be rotated 180 degrees. If two or more quadrants are marked, the frame is blanked. The clocking or timing track 16 includes light 46 and dark 44 regions which correspond radially to the marking areas of the quadrants in the frame regions 21. At the beginning of the clocking track is an index mark 48 which is used to indicate the beginning of the frames 21 and to synchronize the sampling system. As noted previously the printing on the disk such as the frame numbers, for example, "1", the quadrant dividers 40 and 42 and the printing which outlines each frame region 21 should preferably be of a material transparent to the light used to scan the tracks 18-24 and subtracks, however, the index marks 44 and 48 should be a material which is non-transparent or blocks the light being used for scanning the clock track. FIG. 1 illustrates several different orientations for the pictures as designated by the marked frames as set forth in table I below:

TABLE I

| FRAME # | FRAME STATUS | ACTION |
| --- | --- | --- |
| 1 | up-side-down | invert |
| 2 | | no alteration |
| 3 | right oriented | rotate counter clock wise (CCW) |

TABLE I-continued

| FRAME # | FRAME STATUS | ACTION |
| --- | --- | --- |
| 4 | | blank out (1 box marked) |
| 5 | left oriented | rotate clock wise (CW) |
| 6 | up-side-down | invert |
| 7 | | blank out (2 boxes marked) |
| 8 | | no alteration |
| 9 | | blank out (3 boxes marked) |
| . | | |
| . | | |
| . | | |
| 25 | | blank out (1 box marked) |
| 26 | | no alteration |
| 27 | up-side-down | invert |
| 28 | | no alteration |
| 29 | | blank out (1 box marked) |
| 30 | right oriented | rotate CCW |

FIG. 1 shows a frame region 21 being divided into four areas by quadrant divisor marks 40 and 42. Other ways of dividing region 21 into four user markable are shown by frame regions 52-58. Region 52 divides the frame area into four areas using a cross like divider which would require a different arrangement of light and dark regions in the clocking track 16. Region 54 provides oval marking areas like the oval marking areas used on standardized educational tests and would use a clocking track 16 like that shown in FIG. 1. Frame 56 would also use a clocking track as illustrated in FIG. 1, however, the orientation and regions for marking are textually and symbolically illustrated where stick figure symbols are used to indicate the orientation of the picture on the frame and writing is used to define the blanking marking area. Region 58 would use a still further different clocking track since the region is divided into four areas by radial lines. Other possible ways of designating areas marking orientation information can be also used.

Figures 2, 3:
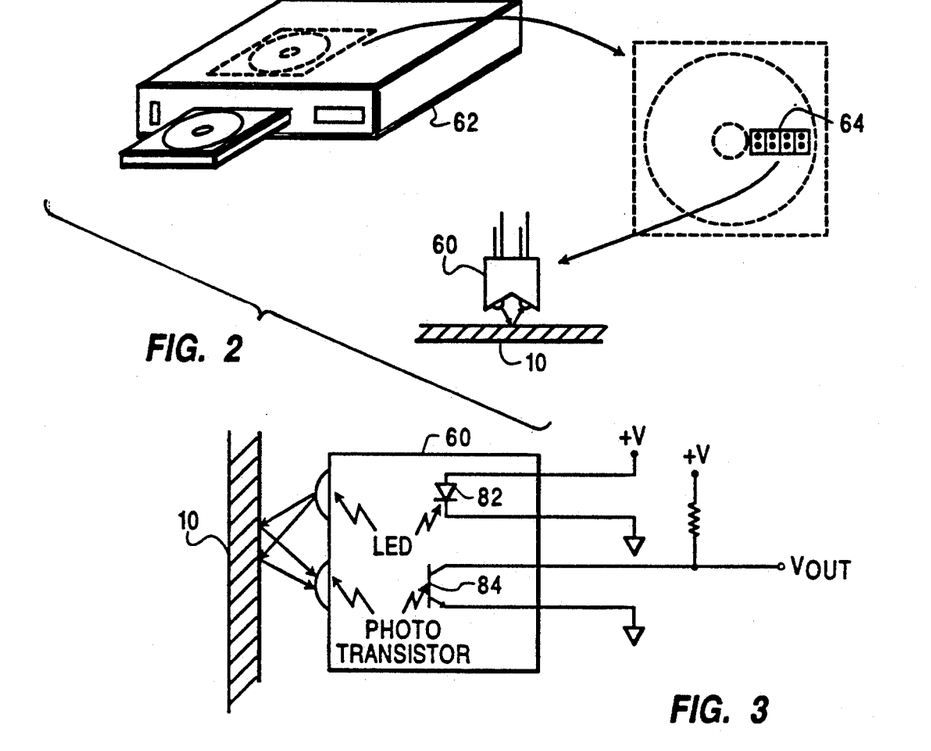
FIG. 2 schematically depicts the positioning of the LED emitters and phototransistor detectors for detecting the marks on the tracks of the disk 10 of FIG. 1.
FIG. 3 illustrates the geometry of an emitter-detector pair confronting a disk.

As illustrated in FIG. 2, the present invention includes light emitting diode-photo transistor detection units 60 mounted in the compact disk player 62 to confront the under side of the CD without touching same. A group 64 of detector units 60 is arranged radially as shown in this figure. At least one detector unit 60 is needed for each subtrack on the disk 10. When the CD rotates, the frame regions 21 cyclically rotate past the group 64 of detectors 60.

FIG. 3 illustrates the typical geometry of the disk 10 and the detector 60 whereby a light emitting diode 82 produces light which is either blocked from reflecting from the disk 10 by a user mark or reflects from the disk 10 because no user mark is present and is detected by phototransistor 84. A suitable detector unit 60 that includes a single laser diode and a single phototransistor can be obtained from Texas Instruments Inc. as Type TIL-139 source and detector assembly. It is of course possible to use other types of line sensors, such as CCDs, in conjunction with other types of light sources to perform the mark detection.

Figure 4:
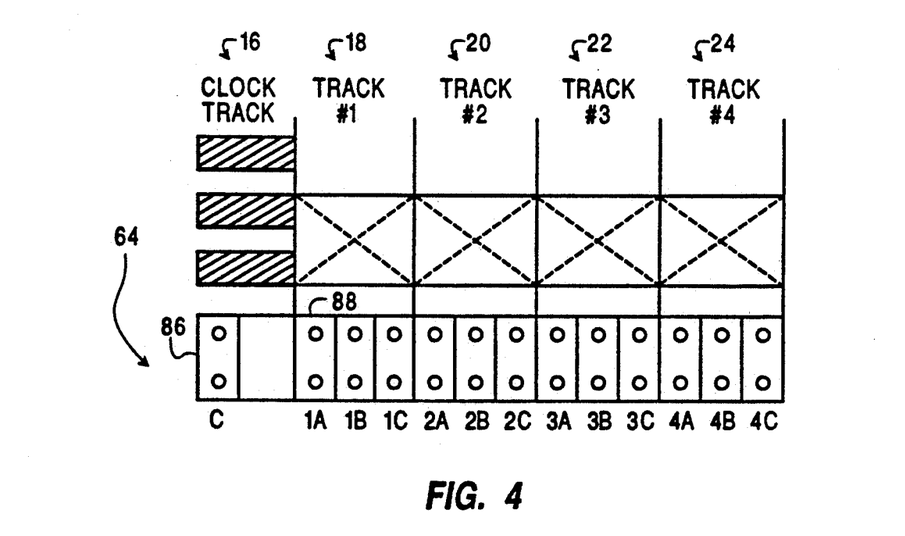
FIG. 4 depicts the relationship between emitter-detector pairs and tracks.
Figure 5:
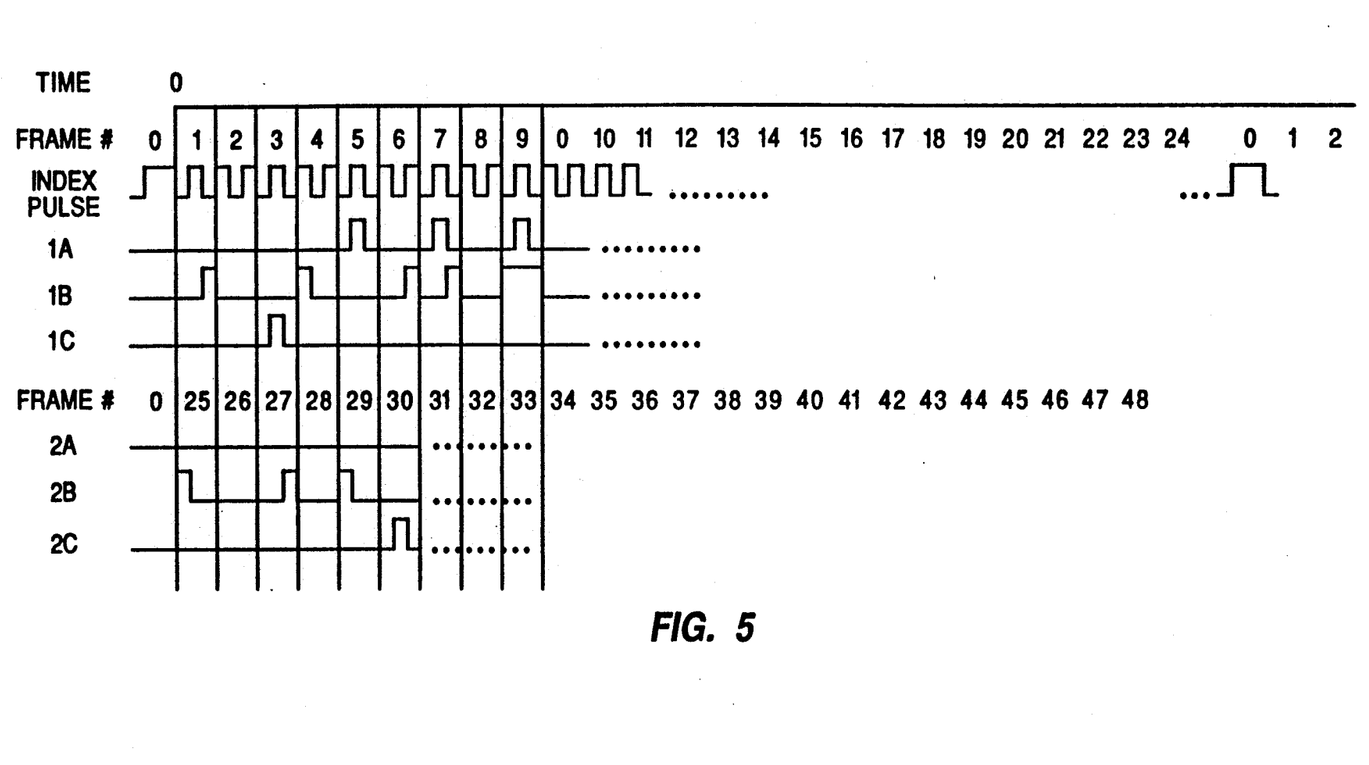
FIG. 5 is a timing diagram showing the signals produced by the emitter-detector arrangement of FIG. 4 by the disk of FIG. 1.

FIG. 4 illustrates in more detail the relationship between the group 64 of detector units 60 and the tracks. For simplicity the tracks 16-24 are shown as rectilinear in this figure when in fact in the preferred embodiment they are circular. As shown detector unit 86 is used to detect the clock track 16 while detector unit 88 is used to detect subtrack 1A of track 1. The other subtracks have corresponding detectors. If the disk 10 of FIG. 1 is rotated over a detector arrangement as illustrated in FIG. 4 the outputs of the detectors 60 would appear as illustrated in the timing diagram of FIG. 5. Please note that this diagram assumes a pulse is produced when a mark is encountered and the laser light is blocked from reflecting. The opposite sense of course could be used. As shown subtrack 1B will produce a pulse in the third rotational segment of frame 1 indicating 180 degrees rotation of the corresponding picture. Note that frame 9 of subtrack 1B is completely filled because all three circular segments of track 18 include user applied marks. If the subtrack 1B frame 9 pulse output by the detector 60 is enlarged the enlargement would show momentary dips in the signal between the marks shown in frame 9 of FIG. 1 since the marks in frame 9 have slight radial separations between them. However, because of the timing of mark sampling as discussed in detail later the 1B subtrack of frame 9 logically appears to have a constant high value.

Figure 6:
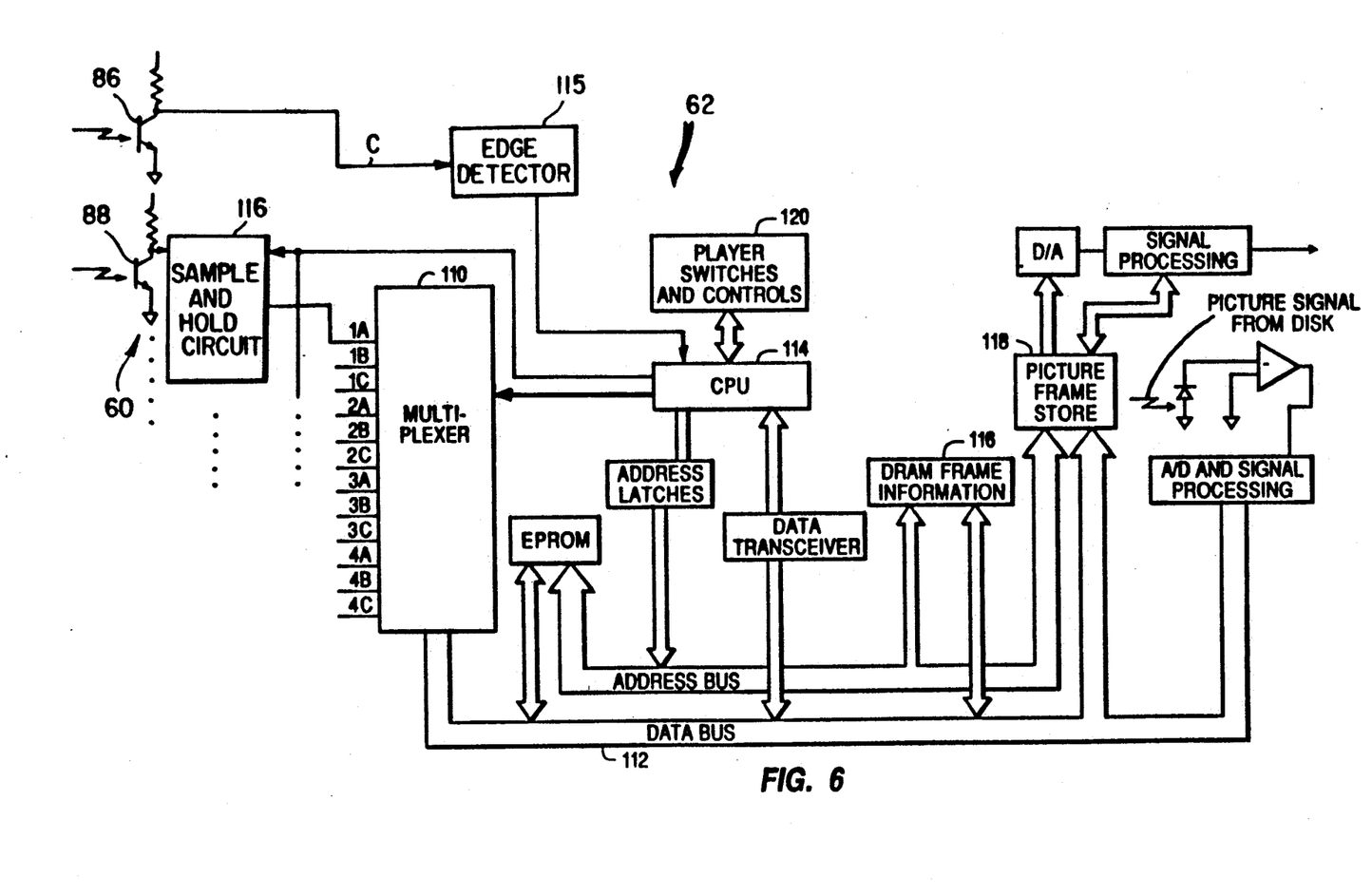
FIG. 6 depicts the components of the system used to determine orientation and blanking of the pictures.

FIG. 6 illustrates the components of the present invention in a conventional compact disk player 62 used to process the signals from the subtracks and the clocking track 16. Multiplexer 110, which is formed with six 2-bit multiplexors, multiplex the outputs from the detectors 60 onto a data bus 112 responsive to selection signals from a central processing unit (CPU) 114. The clock signal c is provided to the CPU 114 through an edge detector circuit 115. When the CPU 114 detects the edge transition by the output of the edge detector circuit 115 going high, the CPU 114 increments an internal counter (not shown). The internal counter value is used to indicate not only which of the sets of radially arranged frames is being read, but can also indicate which subsection of the three subsections of a radial set of frames is being read. When a predetermined time delay, sufficient to allow the disk to rotate to the center of the frame subsection being read, has elapsed, subsequent to the edge detection signal, the CPU 114 outputs a sample and hold signal to conventional sample and hold circuits 116, only one of which is shown for convenience, resulting in sampling and holding the outputs of the track detectors 88. At this time, the CPU 114 also supplies a one bit multiplex selection signal to the multiplexor 110 followed by an enable signal. The selection and enable signals cause the multiplexor 110 to place the outputs 1A-2C of the detectors 88, that is 6 bits, onto the bus 112. If the bus 112 is an 8 bit bus, it is preferable that the bits 1A-2C be placed in the low order bits of the upper byte. After the multiplexor 110 places the outputs 1A-2C on the bus 112, the CPU 114 reads this data off the bus 112 through a data buffer or transceiver 117. The CPU 114 then sends an inverted selection signal to the multiplexor 110 to place the outputs 3A-4C onto the bus 112. Once these outputs have been read by the CPU 114, the CPU 114 waits for another edge transition. When another edge transition is detected, the above discussed multiplexing of detector outputs 1A-2C and 3A-4C occurs again to place the outputs of the detectors 88 for the next frame subsection onto the bus 112.

This cycle of frame subsection reading continues until the contents of all frames have been determined and the frame information is stored in a frame memory 118. The CPU 114 performs the decoding logic illustrated in FIGS. 7A and 7B and conventionally controls the display orientation and skipping of the pictures stored in a frame store 119 responsive to the skipping and orientation information stored in frame memory 118. The remaining components in FIG. 6 which do not have reference numbers are components typically found in a photo CD player and will not be discussed in detail here. Although not shown, the typical photo CD player has several different CPUs and the processor 114 is preferably the processor which executes the software which performs the orientation and blanking operation based on inputs from the player switches and remote control unit devices 120.

Figure 7A:
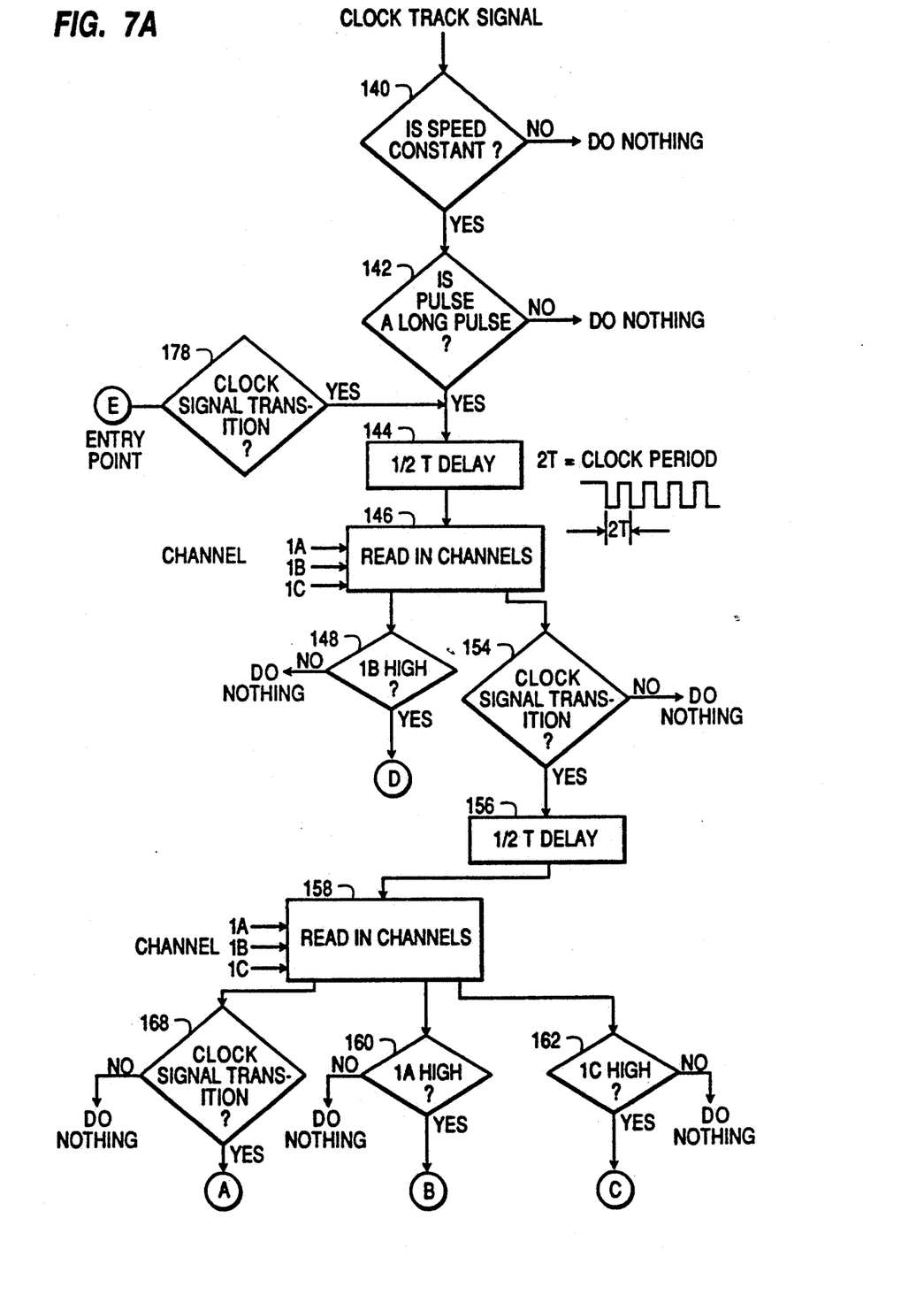
FIGS. 7A and 7B depict the logic performed by CPU 114.
Figure 7B:
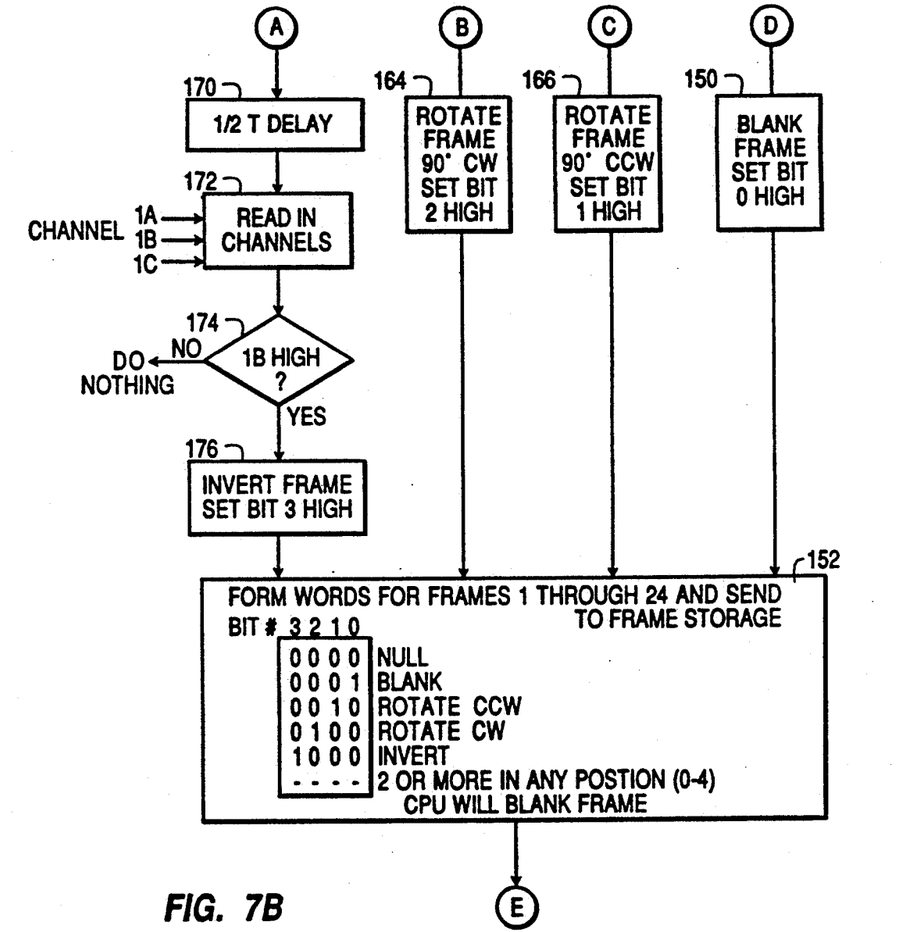

As mentioned above, FIGS. 7A and 7B illustrate the logic performed by the CPU 114 in determining whether a particular picture could be reoriented. The output produced based on this logic, also as mentioned above, is supplied to the orientation and blanking control software which also interfaces with the players switches and remote control 120. The logic depicted by FIGS. 7A and 7B can be implemented in a number of different ways. A person of ordinary skill can provide an appropriate program for processor 114 based on the logic as discussed below. The logic shown in FIGS. 7A and 7B is illustrative with respect to the operations performed for the clocking track 16 and track 1 including subtracks 1A, 1B and 1C, however, identical operations are performed for the other subtracks. That is, frames 1, 25, 49 and 73 (assuming 24 frames per revolution and four tracks) are processed by the same logic in three clock interval times, so that at the end of three clock intervals all information in the first row of frames has been read. First, the system (CPU 114) determines 140 whether the speed of rotation of the disk 10 is constant by, for example, determining the periods between the index signal produced by the index mark 48. If the speed is not constant, the system continues monitoring disk speed. Once the speed is constant, the system checks to determine 142 whether the long pulse produced by index mark 48 has been produced. This can be determined by comparing the pulse widths of the clocking track pulses until the longest pulse is found. If the index mark 48 has been detected, the system delays 144 ¼ T which is equal to ¼ of a clock period as produced by the signals of the clocking track 16. This results in the system reading 146 the outputs of the track detector units 60 in the center of the area where the marks in quadrant 38 for blanking or skipping this frame should exist if skipping is desired. Once the outputs of the track detectors for track 1 have been read, the system determines 148 whether the output for track 1B is high and if so, bit zero of a four bit frame word is set 150 high. Next the four bit word for frame one is formed 152. Step 152 also determines whether more than one bit of the frame word has been set high and sets bit zero high. At the same time or concurrently, the system 114 monitors the clock track signal to determine 154 whether the second clock signal transition has occurred. When the next clock transition occurs a one half T delay 156 occurs followed by reading 158 the output of the detectors for track 1. Once the output of the detectors is read, the system concurrently determines whether the outputs indicate that the signal for subtrack 1A is high 160 and whether the subtrack signal for track 1C is high 162. If the 1A track signal is high, the system sets 164 bit two of the four bit frame word high and if the 1C track signal is high, bit one is set 166 high. The system then again forms the appropriate four bit frame word. Also concurrently subsequent to the reading 158 of the three channels, the system checks 168 for the third clock transition. If the third or last clock transition for this frame is detected, another ½ T delay occurs 170 followed by reading 172 the outputs of the track 1 detectors. If the 1B subtrack signal is high 174, bit three of the frame word is set 176 high followed by the formation 152 of the four bit frame word. Once step 152 has been executed for the third time, the system returns to the clock signal transition monitoring step 178 to read in frames 2, 26, 50 and 74. The four bit frame word produced by step 152 is passed by the CPU 114 to the frame information storage 116 where it will subsequently be read before the corresponding image is displayed. Once the frame words indicating orientation or blanking for all frames are stored, the electronics reads the photographic data as the user requests. When a particular photograph is requested to be displayed, the electronics reads the photographic data and orients the photograph, in accordance with the frame word, before it is displayed.

The present invention has been described with respect to an embodiment that includes four circumferential frame tracks which are marked to indicate blanking and frame orientation. It is of course possible to have more or less tracks depending upon the size of the photo CD and the number of pictures which the photo CD stores. The circumferential pattern could also be replaced by a rectilinear or matrix type pattern in which the frame regions 20 containing the user markable areas for the blanking and orientation information would all be the same size. With a rectilinear pattern it would be necessary to scan the entire disk as it rotates and store the image in a memory and then check the memory contents at specified locations to determine which pictures should be blanked or reoriented. Other patterns are also possible. It is also possible to use the present invention to indicate flicker control, contrast, hue and color changes to the pictures displayed, however, a more complex marking region requiring a more complex mark sensor would be required. It is further possible to provide rotating storage media of other shapes, such as various types of polygons. The present invention can also be implemented using a storage media that does not rotate. For example, a credit card, storing data on an optical data strip, could be scanned by a data reader for reading the user markable surface. In such a system the frame regions of a rectilinear user markable surface on a credit car could, for example, indicate out of date residential address information. It is also possible for the markable surface to be read from the same side as the optically stored data. Such a system would require that two different frequencies of light be used for scanning along with a marking ink transparent to one of the frequencies.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:
1. A data storage apparatus, comprising:
   a reading device reading a photographic data storage device, said photographic data storage device comprising:
      a data recording surface for recording photographic data of a photograph; and
      a user markable surface opposite said data recording surface and having manually marked and machine readable frame regions providing orientation information with respect to the photographic data, said orientation information indicating photograph 180° visual rotation and ±90° visual rotation; and
   a photographic orientation and display device orienting the photographic data and displaying the photograph responsive to the orientation information.
2. An apparatus as recited in claim 1, wherein said data recording surface and said user markable surface are disk shaped.
3. An apparatus as recited in claim 1, wherein said data recording surface and said user markable surface are polygonally shaped.
4. A photo compact disk reader, comprising:
   a data reader reading photographic data from a photo compact disk, the disk having a data recording surface on one side for recording photographs;
   an orientation reader reading a user markable surface of the compact disk on an opposite side to said data recording surface the markable surface having manually marked and machine readable frame regions providing visual orientation information indicating visual orientation of the photographs by 180° and ±90°; and
   a photographic orientation and display device orienting and displaying the photographs responsive to the visual orientation information.
5. A reader as recited in claim 4, wherein said frame regions on said user markable surface comprise manual blanking marks marking whether the photographs should be blanked and said orientation and display device displays responsive to said manual blanking marks.
6. A reader as recited in claim 4, further comprising a description region on said user markable surface for manually writing a subject matter of the photographs.
7. A reader as recited in claim 4, wherein the frame regions are arranged in circumferential tracks and said orientation and display device reading the circumferential tracks.
8. A reader as recited in claim 4, wherein each of the frame regions comprises first through fourth marking areas, the first marking area for indicating photograph blanking, the third marking area for indicating the 180° photograph visual rotation and the second and fourth marking areas for indicating the ±90° photograph visual rotation, respectively.
9. A reader as recited in claim 8, further comprising a timing track on said user markable surface having timing marks aligned with the first, second/fourth and third marking areas said orientation and display device using the timing track to time reading of the frame regions.
10. A photo compact disk reader, comprising:
   a photographic data reader reading a photo compact disk having a data recording side recording photographs optically in photograph tracks;
   an orientation reader reading the photo compact disk having a markable surface on a side of the photo compact disk opposite said data recording side, said surface having manually marked and machine readable marks, being divided into circumferential tracks including a clock track having timing marks for timing reading of the manually marked and machine readable marks and an orientation track for reading orientation of the photographs from the manually marked and machine readable marks, said orientation track being divided into frame regions corresponding to the photograph tracks, each of the frame regions being divided into orientation quadrants aligned with said timing marks, each orientation quadrant having said markable surface manually marked with machine readable orientation information indicating one of a specific visual orientation of 180° and ±90° and blanking for one of the photographs;

an orientation reading device reading the orientation information and orienting the photographs responsive to the orientation information; and a display displaying the oriented photographs.

11. An apparatus, comprising:

a compact disk data reader reading photographic data stored on a photo compact disk having photographs stored on one side and photo orientation information manually marked on a second side, said orientation information indicating orientations of 180° and ±90° of the photographic data;

orientation reading means for machine reading the manually marked orientation information and visually orienting the photographs responsive to the orientation information;

data orientation means for visually orienting the photographic data responsive to the orientation information; and display means for displaying the photographs oriented responsive to the orientation information.

12. An apparatus as recited in claim 11, wherein said orientation reading means comprises at least two light emitting and detector pairs scanning a same surface as the disk rotates and reading the manually marked orientation information; and said data orientation means comprises a processor connected to said pairs, determining photographic orientation from the orientation information, retrieving the photographic data and orienting the photographic data responsive to the orientation information.

13. An apparatus as recited in claim 12, wherein said disk comprises plural orientation information tracks and said orientation reading means further comprises a multiplexer, connected between said detectors and said processor, for controlling sampling the tracks.

14. A method of reading photographs stored on a photo compact disk including a data storage surface and a manually marked user markable surface opposite the data storage surface, said method comprising the steps of:

(a) machine reading photographic orientation information from the manually marked user markable surface including manually made marks indicating orientation of the photographs at 180° and ±90°;

(b) reading photographic data from the data storage surface;

(c) orienting the photographic data responsive to the orientation information; and (d) displaying oriented photographs.

15. A method as recited in claim 14, wherein step (a) comprises the steps of:

(i) rotating the photo compact disk and reading the manually made marks in frame regions arranged in circumferential tracks; and (ii) determining the orientation information from positions of the user marks.

16. A method as recited in claim 15, wherein step (i) includes reading the manually made marks in synchronism with machines made and readable timing marks on a timing track.

* * * * *